US005892226A

United States Patent [19]

Robinson et al.

[11] Patent Number: 5,892,226

[45] Date of Patent: Apr. 6, 1999

[54] TRAFFIC CONTROL SYSTEMS

[75] Inventors: Darren Robinson, Poole; Martin Paul Gilham, Verwood, both of England

[73] Assignee: Siemens plc, England

[21] Appl. No.: 872,369

[22] Filed: Jun. 10, 1997

[30] Foreign Application Priority Data

Jun. 18, 1996 [GB] United Kingdom ................... 9612726

[51] Int. Cl.[6] ........................................ G01V 8/10

[52] U.S. Cl. .................................. 250/338.3; 250/DIG. 1

[58] Field of Search ............................ 250/DIG. 1, 338.3

[56] References Cited

U.S. PATENT DOCUMENTS

| | | | |
|---|---|---|---|
| 4,225,786 | 9/1980 | Perlman . | |
| 5,714,754 | 2/1998 | Nicholas | 250/221 |

FOREIGN PATENT DOCUMENTS

| | | | |
|---|---|---|---|
| 0250746A2 | 1/1988 | European Pat. Off. . | |
| 0 287 827 A2 | 10/1988 | European Pat. Off. . | |
| 0582941A1 | 2/1994 | European Pat. Off. . | |
| 2 157 821 | 5/1973 | Germany . | |
| 31 42 978 A1 | 5/1983 | Germany . | |
| 63-247684 (A) | 10/1988 | Japan | 250/DIG. 1 |
| 2-297090 (A) | 12/1990 | Japan | 250/DIG. 1 |
| 8304460 | 7/1985 | Netherlands . | |
| 1 447 372 | 8/1976 | United Kingdom . | |
| 2278437 | 11/1994 | United Kingdom . | |

*Primary Examiner*—Constantine Hannaher
*Attorney, Agent, or Firm*—Evenson, McKeown, Edwards & Lenahan P.L.L.C.

[57] ABSTRACT

A traffic light control system comprises a passive infra-red presence detection system for detecting the presence of a target emitting infra-red radiation, which comprises a pyro-electric detector including an array of pyro-electric sensor elements. The pyro-electric detector is arranged to generate a signal representative of movement of the target within a detection zone of the detector. By priding a signal processing unit which operates to analyse pulses present in the signal, the said presence detection system is provided with a means whereby it can not only detect movement of the target within the detection zone but also whether that target has moved into and stopped within the detection zone.

14 Claims, 4 Drawing Sheets

TRAFFIC CONTROL SYSTEMS

BACKGROUND OF THE INVENTION

The present invention relates to passive infra-red presence detectors which operate to detect the presence of a target emitting infra-red radiation.

In particular, but not exclusively, the present invention relates to passive infra-red presence detectors for use within traffic control systems.

Traffic control systems operate to regulate the flow of traffic at predetermined junctions within a road system of a town. Typically, traffic control systems take the form of traffic lights operatively connected to a controller. The controller operates to generate instructions which are visually represented by the traffic lights, which thereby provides a means for instructing the vehicles to 'stop' or 'go' in accordance with a predetermined routine. In order to operate effectively, such traffic control systems must be provided with a means for detecting the presence and movement of vehicles.

Known systems for detecting the presence and movement of vehicles on roads include the use of inductance loops buried in roads over which the vehicles pass. An inductance loop operates to detect the presence of a vehicle from a change in the inductance of the loop, as a result of the presence of a vehicle. Disadvantages with this known system arise from the requirement that the inductance loop must be buried in a road at a position over which the vehicles pass. Inductance loops are expensive to bury and are often disturbed when the road in which they are buried has to be repaired or, alternatively the repair of the road is rendered more difficult. Furthermore, inductance loops are unsuitable for use with metalised roads.

The aforementioned disadvantages with inductance loops have led to a preference for above ground detectors. Such above ground detectors include microwave sensors which operate to detect microwaves transmitted and reflected by vehicles on an approach road to a traffic control system, thereby providing a means for detecting the movement of a vehicle from the reflected microwaves, in accordance with a change in a time between transmission and reception. Such microwave sensors are however expensive. For this reason passive infra-red detectors, which serve to detect the presence of a target vehicle from infra-red radiation emitted thereby, are preferred.

Known passive infra-red detectors use either pyro-electric sensors or thermopile sensors, or a combination of both. A thermopile sensor operates to generate a signal representative of an absolute level of infra-red radiation received from a target vehicle. Thermopile sensors are therefore appropriate for use in detecting static target vehicles, although they may also be used for dynamic targets. However, thermopile sensors are expensive to implement and provide a poor signal to noise ratio. By contrast, pyro-electric sensors are inexpensive and provide a comparatively high signal to noise ratio. However pyro-electric sensors suffer a disadvantage in that they only detect changes in infra-red radiation. Therefore, such pyro-electric sensors are only suitable for detecting movement of a target emitting infra-red radiation and hitherto have been inappropriate for use in detecting stationary targets. For this reason, passive infra-red presence detection systems, which are required to detect both stationary as well as moving targets embody both pyro-electric sensors as well as thermopile sensors.

SUMMARY OF THE INVENTION

It is an object of the present invention to provide advantages in terms of expense and complexity to infra-red presence detectors.

According to the present invention a passive infra-red presence detector for detecting the presence of a target emitting infra-red radiation may comprise a pyro-electric detector comprising a plurality of pyro-electric sensor elements, each of which plurality of pyro-electric sensor elements operates to generate signals representative of a change in an amount of infra-red radiation illuminating each said element, the plurality of said sensor elements being connected and arranged to communicate the signals produced therefrom to a signal processing unit, wherein the signal processing unit operates to detect pulses present in a composite signal formed from a combination of the said signals indicative of static as well as dynamic movement of the target.

Pyro-electric detectors provide an inexpensive means for detecting movement of a target emitting infra-red radiation. Such detectors are typically comprised of sensor crystals which develop a potential difference between two sides thereof, in accordance with a change in a level of infra-red radiation which illuminates the sensor crystal. Furthermore, such sensor crystals comprise a characteristic capacitance, which has the effect of providing the sensor crystals with a means for retaining some of the charge produced from the potential difference generated by a change in incident infra-red radiation, which is thereafter slowly discharged in accordance with known principles.

Heretofore pyro-electric detectors embodying pyro-electric sensor crystals have been used to detect movement only, because the sensor crystals only generate a signal when the infra-red radiation is changing and are therefore unsuitable for detecting targets which are static. However, by providing a signal processing unit which operates to compare pulses present in a signal representative of a combination of signals generated from a plurality of pyro-electric sensor crystals, with a predetermined set of characteristic pulses, an inexpensive infra-red presence detector may be provided with a means for detecting a stationary as well as a moving target.

According to another aspect of the present invention, there is provided a method of detecting static and dynamic movement of a target emitting infra-red radiation, comprising combining signals produced by each sensor of a plurality of pyro-electric sensors to form a composite signal, forming a first time width in accordance with a difference between a time when the said composite signal reaches a predetermined threshold and a time when the composite signal returns to the threshold, determining a first maximum amplitude of the said signal during the first time width, forming a second time width in accordance with a difference between a time when the said composite signal again reaches the predetermined threshold and a time when the composite signal again returns to the threshold, determining a second maximum amplitude of the signal during the second time width, and comparing a combination of the first time width and the first maximum amplitude and the second time width and the second maximum amplitude with a predetermined value.

According to a further aspect of the present invention there is provided a traffic control system comprising an infra-red presence detector as hereinbefore described for detecting the presence of vehicles at a predetermined point on a road, a traffic controller connected to the infra-red presence detector to generate traffic control commands in accordance with signals received from the infra-red presence detector and signalling means to provide visual commands to vehicles.

Other objects, advantages and novel features of the present invention will become apparent from the following detailed description of the invention when considered in conjuction with the accompanying drawings.

DETAILED DESCRIPTION OF THE DRAWINGS

Figure 1:
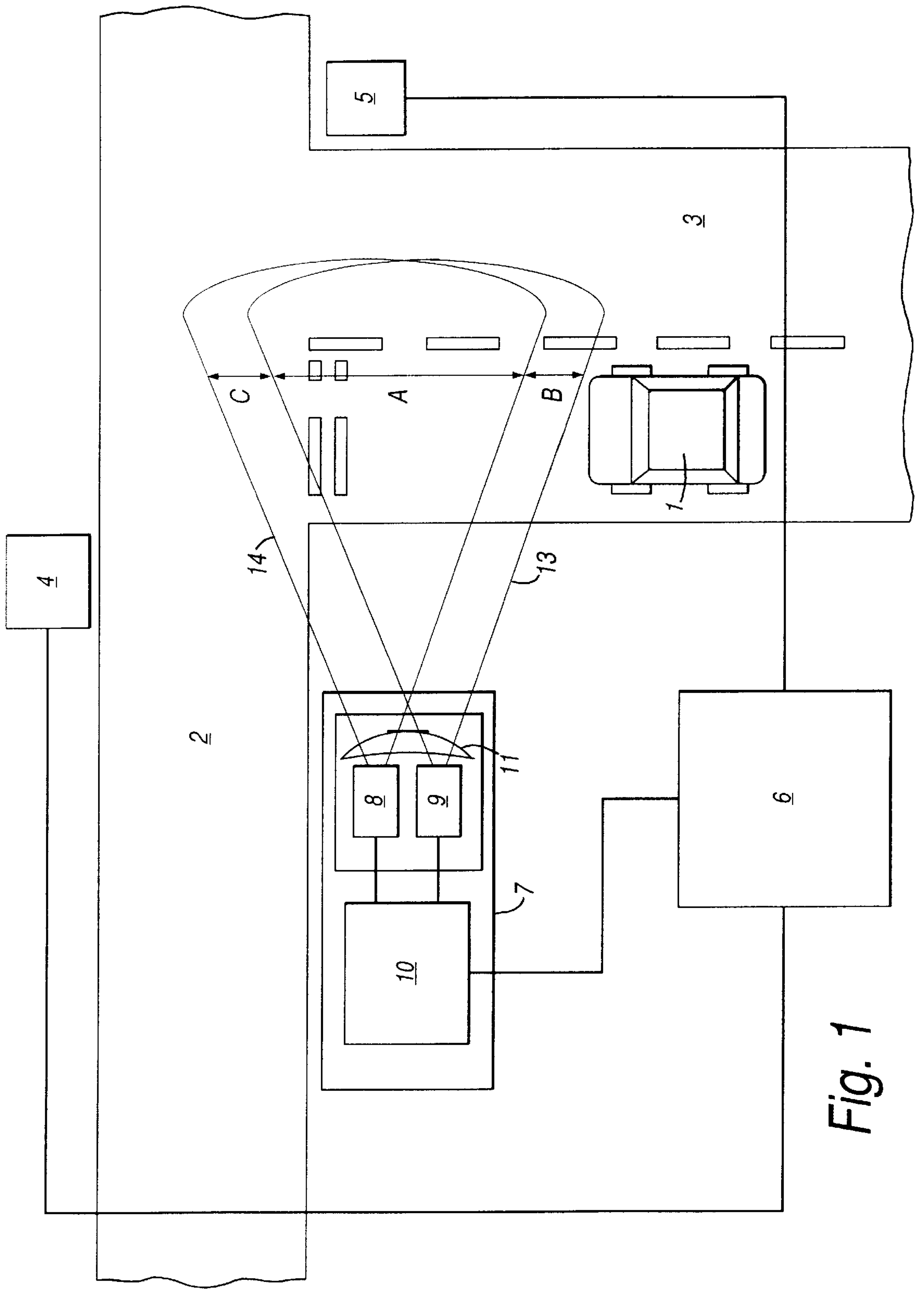
FIG. 1 is a schematic conceptual block diagram of a traffic control system which operates to control the traffic at a junction.

An example of a traffic control system which operates to regulate the flow of traffic at a road junction may be seen in FIG. 1. In FIG. 1 a vehicle 1, approaches a junction formed by a main road 2, and an approach road 3, which roads together form a 'T-junction'. Traffic flow at the T-junction is controlled by means of a traffic control system. The traffic control system is comprised of traffic lights 4, 5, a controller 6, and a passive infra-red presence detector 7. The controller 6, operates to drive the traffic lights 4, 5. The traffic lights 4, 5, serve to provide visual realisation of instructions generated by the controller 6. The instructions are generated in accordance with the traffic flow on the roads 2, 3. In order to provide a means whereby the traffic control system can detect the presence or absence of vehicles, the passive infra-red presence detector 7, is provided which operates to generate signals representative of the presence of vehicles, thereby forming an indication of the traffic flow.

In FIG. 1, the infra-red presence detector 7, is shown to be comprised of a pair of pyro-electric sensors 8, 9, connected to a signal processing unit 10. Also shown within the infra-red presence detector 7, is a fresnel lens 11, the said lens being positioned before both of the pyro-electric sensors 8, 9. The fresnel lens 11, serves to concentrate infra-red radiation, passing therethrough onto the pyro-electric sensors 8, 9. Each of the pyro-electric sensors 8, 9, in combination with the corresponding fresnel lens 11, is provided with a field of view, wherein infra-red radiation emitted from a target within that field of view will pass into and be detected by the pyro-electric sensor and any infra-red radiation emitted by a target outside the field of view will not pass into that pyro-electric sensor and therefore will not be detected. In FIG. 1, the field of view of each of the pyro-electric sensors 8, 9, is shown in a conceptual form as the area within the solid lines 13, 14.

The pyro-electric sensors 8, 9, within the passive infra-red presence detector 10, are arranged such that the fields of view of each one of the pair pyro-electric sensors overlap. A region where the fields of view overlap, will hereinafter be known as the detection zone and is designated A in FIG. 1. At either side of the detection zone A, are two peripheral zones B, C, where a target body will be in the field of view of one of the said pair of pyro-electric sensors but not the other of the said pair. The pyro-electric sensors 8, 9, form part of a pyro-electric detector 15. The pyro-electric detector 15, may for example be an 'LHi 954' or 'LHi 958' or similar device manufactured by E G & G Heimann opto-electronics GmbH Wiesbaden, Germany, to which reference is hereby made.

Pyro-electric detectors are known to provide an inexpensive means for detecting the movement of targets emitting infra-red radiation in applications such as burglar alarms. However, for traffic control systems, a detector must also be provided with a means for detecting a static target. This is achieved by providing the signal processing unit 10, to process signals generated by the pyro-electric detector 15, formed from each of the pair of pyro-electric sensors 8, 9. The signal processing unit 10, operates to analyse the characteristic of signals generated by the pyro-electric detector 15, indicative of static as well as dynamic movement of a target within the detection zone A, and peripheral zones B, C. The operation of the infra-red presence detector 7, will now be described in more detail with reference to FIG. 2.

Figure 2:
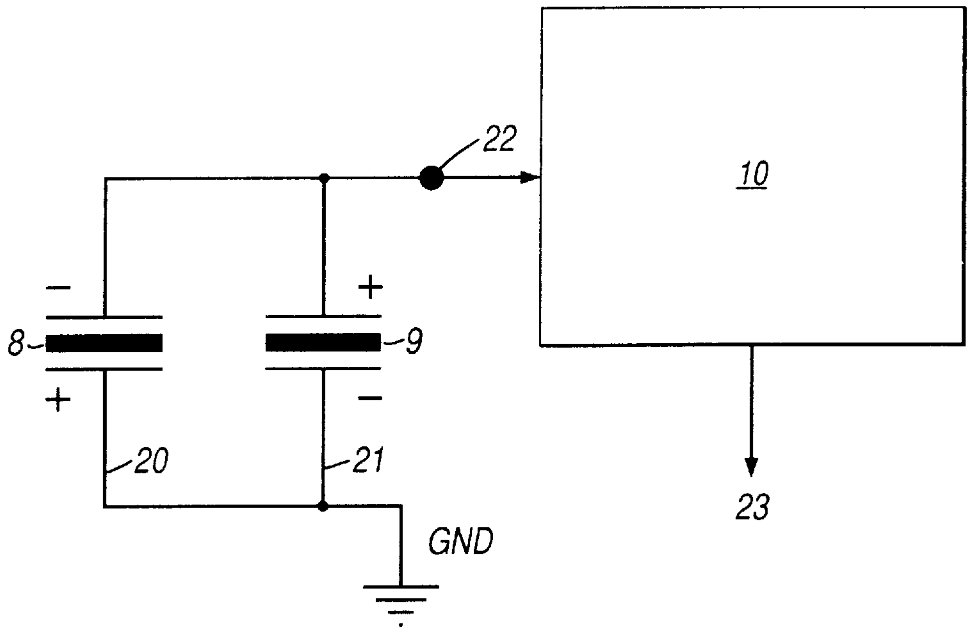
FIG. 2 shows an electrical circuit diagram of a pyro-electric detector connected to a signal processing unit.

FIG. 2 shows a combined electrical circuit and block diagram of the infra-red presence detector 7, wherein parts which also appear in FIG. 1 bear identical numerical designations. In FIG. 2 there is shown a pair of pyro-electric sensors 8, 9, which are sensor crystals. The sensor crystals 8, 9 have an electrical capacitance associated therewith, which serves to store electrical charge generated by the sensor crystal 8, 9. Sensor crystals 8, 9, generate a potential difference between two sides thereof in accordance with and in proportion to a change in infra-red radiation emitted within the field of view of the sensor crystals 8, 9. Furthermore, the potential difference generated by the sensor crystals 8, 9, is polarised in dependence upon a physical orientation of the crystal. This is designated in FIG. 2 by the signs '+' and '−'. The sensor crystals 8, 9, shown in FIG. 2, are arranged and connected such that the relative polarities of the potential differences developed by the two crystals are opposed. This arrangement serves to cancel any background radiation which is detected by the two sensor crystals so that, for example, changes in infra-red radiation generated from the sun are nullified. One side of the sensor crystals 8, 9 are connected to ground GND, via conductors 20, 21. The other side of the sensor crystals 8, 9, are connected to the signal processing unit 10, via a terminal 22. An output 23, from the signal processing unit 10, is connected to the traffic controller 6, not shown in FIG. 2.

The illustrative embodiment of the infra-red presence detector show in FIG. 2, shows an arrangement wherein the sensor crystals 8, 9, are connected in parallel. The effect of this arrangement is that electrical signals formed from the potential differences developed across the sensor crystals 8, 9, are combined to provide a composite signal, appertaining to a variation in a potential difference developed between the terminal 22 and ground GND, with time. However, in an alternative arrangement the signals appertaining to a variation in potential difference with time generated by individual sensor crystals, may be fed separately to the signal processing unit, 10 and combined therein.

Figure 3A:
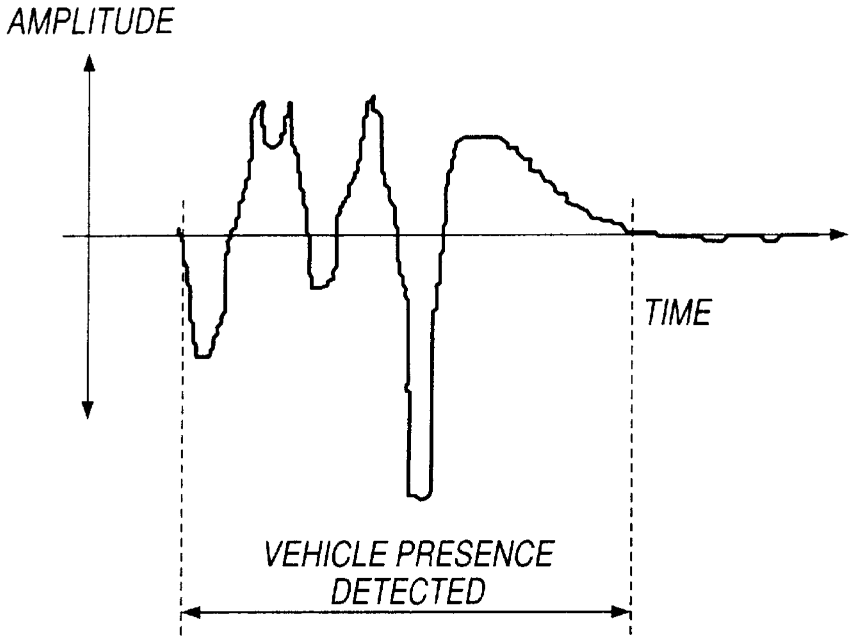
FIGS. 3*a* and 3*b* are a set of waveform diagrams which represent a set of signals which are generated at the output of the pyro-electric sensor, and, FIG. 4 is a schematic block diagram of a pyro-electric detector.
Figure 3B:
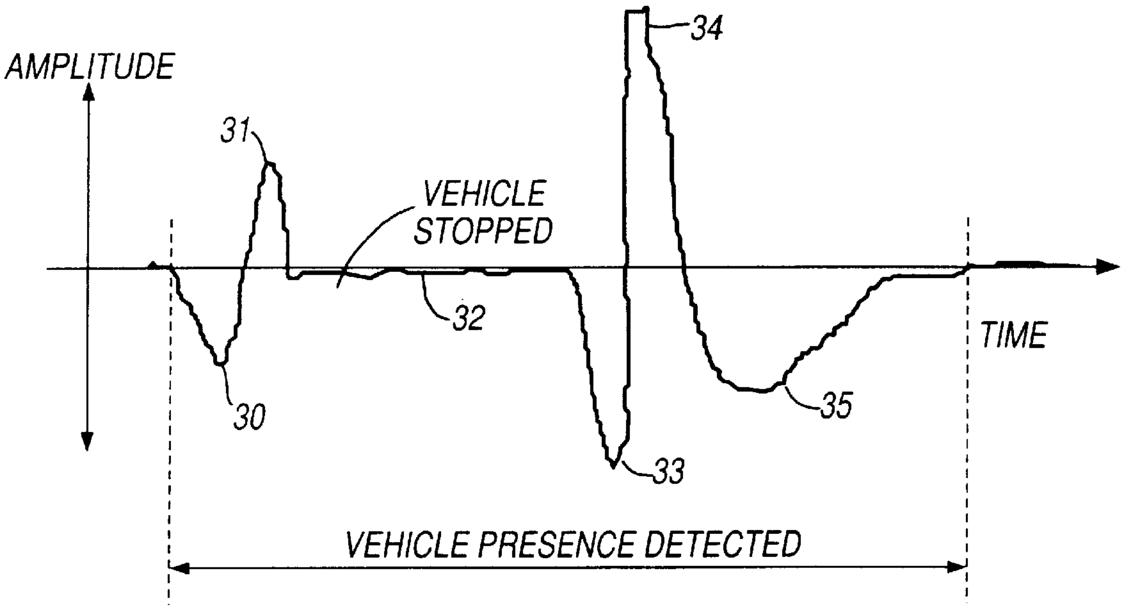

An illustration of a set of signals generated at the terminal 22 in FIG. 2, representative of the effect a target moving within the fields of view of the sensor crystals 8, 9 is shown in FIGS. 3*a* and 3*b*. FIGS. 3*a* and 3*b* present two signal waveforms appertaining to a representation of a variation of potential difference at the output terminal 22, with time. FIG. 3*a* represents a signal generated by the combination of sensor crystals 8, 9, for a vehicle passing through the detection zone A, of the pyro-electric detector 15, as well as the peripheral zones B and C, without stopping. FIG. 3*b* represents a signal waveform appertaining to a signal generated by the combination of sensor crystals 8, 9, for a vehicle passing through the first peripheral zone B, into and stopping in the detection zone A, and, after a sojourn continuing again out of the detection zone A, and passing through the detection zone C. The corresponding effect on the signal waveform presented in FIG. 3*b*, is explained as follows: As the vehicle moves into the detection zone A, two pulses 30, 31, of substantially equal amplitude and duration are produced. The signal then returns to zero and remains substantially zero during the sojourn period 32, whilst the vehicle remains static within the detection zone A. When the vehicle again begins to move out of the detection zone A, the pulses 33, 34, are produced, which are again of substantially equal amplitude and duration. As the vehicle moves out of the detection zone A, into the second of the two peripheral zones C, the tail pulse 35, is produced. Unlike the other pulses 30, 31, 33, 34, the tail pulse 35, has a longer duration and is substantially smaller in amplitude than the previous pulse 34.

The pulses 30, 31, 33, 34, 35, which comprise the signal waveform diagram shown in FIG. 3*b* are representative of the response of the sensor crystals 8, 9, as the target vehicle moves within the fields of view of respective sensor crystals 8, 9. Potential differences developed across the individual sensor crystals 8, 9, will be in proportion to the strength of infra-red radiation received thereby and have opposite effects on the composite signal, illustrated in FIG. 3*b*. The signal pulses 30, 31, are generated as the vehicle moves into the detection zone A. If the vehicle then stops, the signal pulse 31, will be short and will return to zero and will remain zero during the sojourn period when the vehicle is stationary within the detection zone A. Similarly, as the vehicle moves off again the potential differences developed across the individual sensor crystals 8, 9, develop in proportion with the infra-red radiation received from the target and will have opposite effect on the composite signal, illustrated in FIG. 3*b*, thereby producing characteristic pulses 33, 34. However, where the vehicle moves out of the detection zone A and into the peripheral zone C, the vehicle will be within the field of view of the second of the two crystal sensors 8, only, thereby generating the characteristic tail pulse 35. The pulse 35, is produced where a potential difference is generated across one of the sensor crystals only and the capacitance of that sensor crystal serves to discharge that potential difference in a characteristic exponentially decaying manner in accordance with principles well known to the skilled artisan. Therefore, by comparing the amplitude and duration of pulses generated by the combination of sensor crystals 8, 9, as illustrated in FIG. 3*b*, with the amplitude and duration of a subsequent pulse, it is possible to detect the characteristic tail pulse 35, and thereby detect whether or not the vehicle which has entered the detection zone A, has subsequently left the detection zone A. The signal processing unit 10, which appears in FIG. 2, therefore serves to monitor the pulses generated at the terminal 22, and by providing the signal processing unit with a means whereby it can recognise the characteristic features of the signal pulses illustrated in FIG. 3*b*, the infra-red presence detector 7, is provided with a means whereby it can detect whether a vehicle has passed into the detection A, and when it has left the detection zone A.

Figure 4:
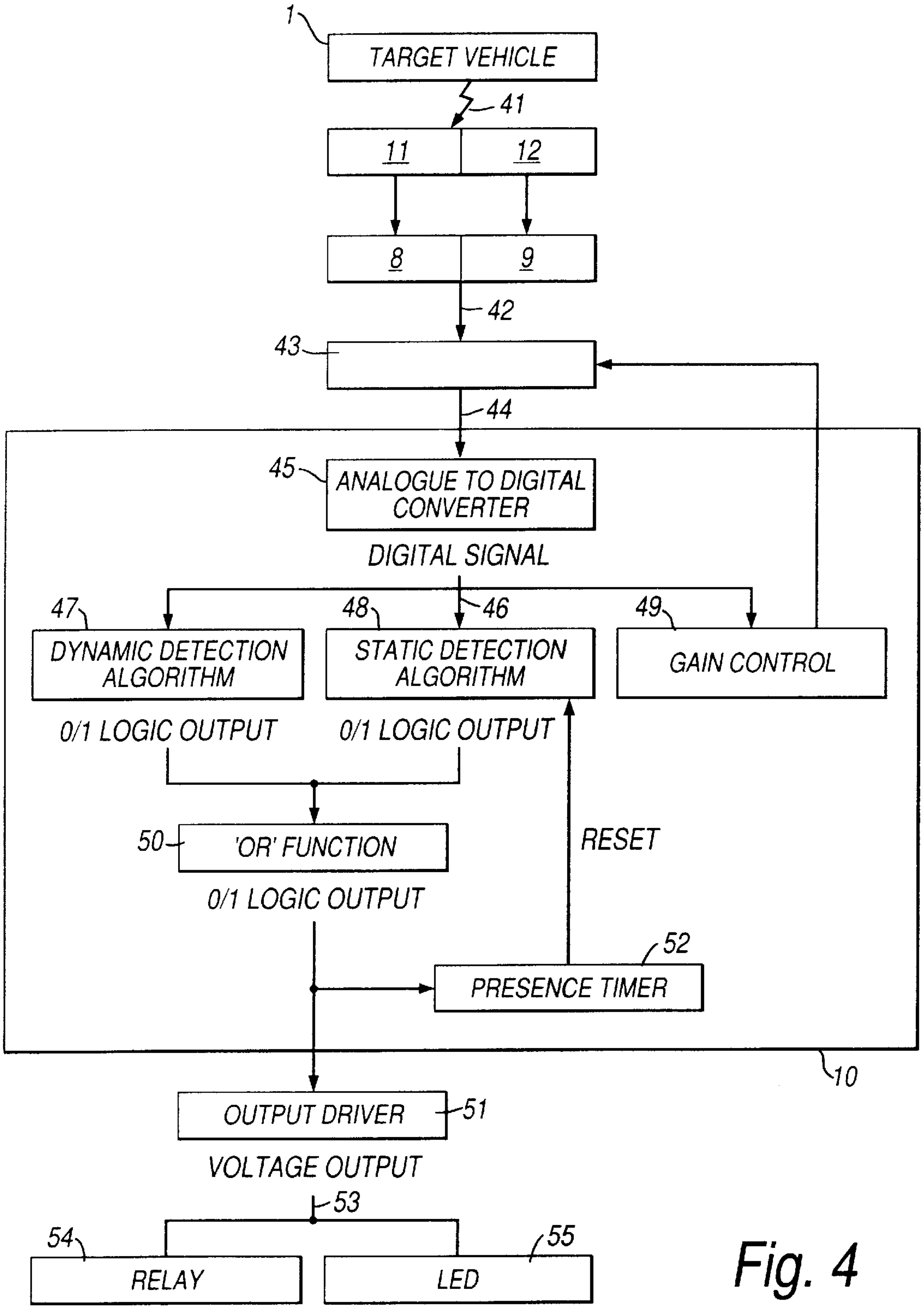

The signal processing unit 10, is shown in detail in FIG. 4 wherein parts which also appear in FIG. 2 bear identical numerical designations. FIG. 4 represents a schematic block diagram of the elements which comprise the passive infra-red presence detector 7, and other elements which make up the traffic light controller. Referring to FIG. 4, the pyro-electric sensors 8, 9, receive infra-red radiation 41, emitted from a target vehicle 1, which is focused by fresnel lens elements 11, 12 onto the pyro-electric sensors 8, 9. The pyro-electric sensors 8, 9, generate a composite signal 42, representative of a change of infra-red radiation 41 within the field of view of the pyro-electric sensors 8, 9, in accordance with the principles hereinbefore described. The composite signal 42, is communicated to a pre-amplifier and gain stage 43, which operates to filter and amplify the composite signal 42, generated by the pyro-electric sensors 8, 9. A filtered and amplified signal 44, is then communicated to an analogue to digital converter 45, within the signal processing unit 10. The analogue to digital converter 45, serves to generate digital samples 46, of the analogue composite signal in accordance with digital signal processing techniques. The digital signal samples 46, are then communicated to three further processing units which represent a dynamic detection algorithm 47, a static detection algorithm 48, and a gain control 49. The dynamic detection and static detection algorithms 47, 48, serve to generate Boolean output signals which are either logic 'true' or logic 'false'. The outputs from the dynamic and static detection algorithms 47, 48, are fed to a logic function 50, which serves to logic 'OR' the output from the dynamic and static detection algorithms 47, 48, therefore providing an overall logic Boolean output of true or false in dependence upon the corresponding outputs from the static detection and dynamic detection algorithms 47, 48. The output from the logic function 50, is communicated to an output driver 51 and a presence timer 52. The output driver serves to drive the controller 6, within the traffic light control system via conductor 53.

In operation the pyro-electric sensor generates signals 42, as hereinbefore described which are amplified and filtered by the pre-amplifier and gain stage 43, and thereafter are communicated to the signal processing unit 10. Within the signal processing unit 10, the analogue to digital converter 45, serves to generate digital samples of the analogue waveform generated by the pyro-electric sensors 8, 9. The digital samples are then passed to the dynamic and static detection algorithms 47, 48. The dynamic detection algorithm 47, serves to generate an output signal representative of a Boolean logic variable which is either 'true' or 'false' in accordance with whether a signal generated by the pyro-electric sensors 8, 9, is characteristic of a target moving within the field of view of the pyro-electric sensors 8, 9. The static detection algorithm 48, on the other hand, serves to detect whether a target has moved into and has stopped within the field of view of the pyro-electric sensors 8, 9. This is achieved by providing a means for calculating a representation of the character of each pulse, which is calculated by dividing the square of the time width by the amplitude of the pulse. Thereafter the static detection algorithm stores successive values calculated in accordance with this relationship. Where the height and width of successive pulses is approximately equal, the ratio of successive values calculated in accordance with this relationship will be close to unity. This case will be consistent with the situation where a target moves into the field of view of the pyro-electric sensors 8, 9. Where however, a high amplitude, narrow duration pulse has been followed by a low amplitude wide duration pulse, which is consistent with the situation where the vehicle has now moved out of the detection zone, the ratio of values calculated in accordance with this relationship will be greater than or less than unity. The static detection algorithm 48, is provided with a means for forming the ratio of successive values according to this predetermined relationship, thereby providing a means whereby it can detect whether the target vehicle has moved into the field of view and stopped. In such a case, the static detection algorithm 48, is arranged to provide a Boolean output signal representing logic 'true'.

The Boolean output variables from a dynamic detection and static detection algorithms 47, 48, serve to feed a logic function 50, which operates to 'OR' the outputs of the static and dynamic algorithms 47, 48, providing an overall Boolean output value to indicate whether there is a target vehicle within the detection zone A. When an output from the logic function 50, is representative of a logic 'true', a clock within the presence timer 52, starts, thereby providing a means for measuring the time when the output from the logic function 50, is 'true'. If the clock within the presence timer 52, reaches a predetermined time limit, a reset signal is generated which is communicated to the static detection algorithm 48. The reset signal serves to reset the static detection algorithm 48, in consequence of a false alarm trigger. The output from the logic function 50, is also communicated to an output driver 5 1, which output driver 51, serves to generate signals which are sufficient to drive a relay 54, and a Light Emitting Diode (LED) 55. The gain control unit 49, within the signal processing unit 10, serves to control the pre-amplifier and gain stage 43, in accordance with the signals generated by the analogue to digital converter, so that the amplitude of the digital samples provided by the digital to analogue converter remain within a predetermined range.

As will be appreciated by the cogniscenti, various modifications may be made to the arrangements hereinbefore described without departing from the scope of the invention and for example, the method of detecting a static target within the detection zone may comprise alternative steps, which may include a measurement of the rate of decay of signal pulse generated from the pyro-electric detector or differentiating the composite signal to detect characteristic signal pulses. Furthermore, the infra-red presence detector hereinbefore described for use with signal traffic light controlling apparatus may also have application in burglar alarm systems, for example.

We claim:

1. A passive infra-red presence detector for detecting the presence of a target emitting infra-red radiation, comprising a pyro-electric detector having a plurality of pyro-electric sensor elements, each of which plurality of pyro-electric sensor elements operates to generate signals representative of a change in an amount of infra-red radiation illuminating each said element, the plurality of said sensor elements being connected and arranged to communicate the signals produced therefrom to a signal processing unit, wherein:

the signal processing unit operates to detect pulses present in a composite signal formed from a combination of the said signals indicative of static as well as dynamic movement of the target; and the signal processing unit comprises means for calculating first data substantially representative of an integral of the pulses present in the composite signal, means for calculating second data representative of a ratio of said first data for a first pulse and said first data for a second pulse, and means for generating an output signal in dependence on a comparison of the second data with a predetermined value, whereby static and dynamic movement of the target in accordance with characteristic pulses present in the composite signal can be detected.

2. A passive infra-red presence detector as claimed in claim 1, wherein the means for calculating first data comprises means for calculating the square of a time width when the composite signal remains above a predetermined threshold, divided by a maximum amplitude of the composite signal during the time width.

3. A passive infra-red presence detector as claimed in claim 1 wherein the signal processing unit further includes a dynamic detection processor, which operates to generate third data representative of a comparison of the composite signal with a first sequence of predetermined values within a first time period indicative of the target moving into and out of a detection zone of the infra-red detector.

4. A passive infra-red presence detector as claimed in claim 3, wherein the signal processing unit first includes a static detection process, which operates to generate fourth data representative of a comparison of the composite signal with a second sequence of predetermined values within a second time period indicative of the target moving into and remaining within a detection zone of the infra-red presence detector.

5. A passive infra-red presence detector as claimed in claim 4, wherein the signal processing unit further includes a logic function which operates to generate fifth data in dependence upon said third and fourth data, indicative of whether the target has moved into and remains within the detection zone, or has passed through the detection zone.

6. A passive infra-red presence detector as claimed in claim 5, wherein the signal processing unit further includes a false alarm monitor connected to the logic function and the static detection processor, which false alarm monitor comprises a presence detection clock which operates in dependence upon the fifth data to measure a presence detection time during which the fifth data indicates the presence of the target within the detection zone, and a reset means which operates to generate a reset signal communicated to the static detection processor when the presence detection time reaches a predetermined value.

7. A passive infra-red presence detector as claimed in claim 6, wherein the false alarm monitor operates in dependence upon the fourth data to measure the presence detection time during which the fourth data indicates the presence of the target within the detection zone, and the reset means operates to generate the reset signal when the presence detection time reaches the predetermined value.

8. A passive infra-red presence detector as claimed in claim 1, further comprising a fresnel lens being adapted and arranged to focus infra-red radiation passing therethrough onto said plurality of pyro-electric sensor elements.

9. An infra-red presence detector as claimed in claim 1, wherein the plurality of pyro-electric sensor elements consists of two pyro-electric sensor elements.

10. An infra-red presence detector as claimed in claim 9, wherein two pyro-electric sensor elements are a pair of sensor crystals connected in parallel, and a polarity of one of the said pair is opposite to a polarity of another of the said pair.

11. A method of detecting static and dynamic movement of a target emitting infra-red radiation, comprising combining signals produced by each sensor of a plurality of pyro-electric sensors of a pyro-electric detector to form a composite signal, forming a first time width in accordance with a difference between a time when the said composite signal reaches a predetermined threshold and a time when the composite signal returns to the threshold, determining a first maximum amplitude of the said signal during the first time width, forming a second time width in accordance with a difference between a time when the said composite signal again reaches the predetermined threshold and a time when the composite signal again returns to the threshold, determining a second maximum amplitude of the signal during the second time width, and comparing a combination of the first time width and the first maximum amplitude and the second time width and the second maximum amplitude with a predetermined value indicative of the presence or movement of the target.

12. A method of detecting static and dynamic movement of a target emitting infra-red radiation as claimed in claim 11, further comprising forming a first characteristic value by dividing the square of the first time width by the first maximum amplitude, forming a second characteristic value by dividing the square of the second time width by the second maximum amplitude, forming a ratio between the first and the second characteristic values, and comparing the ratio with a predetermined value indicative of the presence or movement of the target.

13. A method of detecting static and dynamic movement of a target emitting infra-red radiation as claimed in claim 12, further comprising storing ratios between the first and second characteristic values generated over a predetermined time period, and comparing the ratios with a predetermined sequence of values corresponding to a target vehicle moving into and stopping within a detection zone of the pyro-electric detector.

14. A method of detecting static and dynamic movement of a target emitting infra-red radiation as claimed in claim 13, further comprising comparing the ratios with a predetermined sequence of values corresponding to a target vehicle passing through the detection zone of the pyro-electric detector.

* * * * *